United States Patent
Lee et al.

(10) Patent No.: US 10,738,177 B2
(45) Date of Patent: Aug. 11, 2020

(54) POLYMER COMPOSITION AND POLYMER COMPOSITE AND OPTICAL FILM

(71) Applicant: SAMSUNG ELECTRONICS CO., LTD., Suwon-si, Gyeonggi-do (KR)

(72) Inventors: Eun Sung Lee, Hwaseong-si (KR); Young Jae Kang, Yongin-si (KR); Won Joon Cho, Suwon-si (KR); Won Cheol Jung, Seoul (KR); Hyunseok Choi, Anyang-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/852,160

(22) Filed: Dec. 22, 2017

(65) Prior Publication Data
US 2018/0258258 A1   Sep. 13, 2018

(30) Foreign Application Priority Data

Mar. 9, 2017   (KR) .................. 10-2017-0030151

(51) Int. Cl.
*C08K 3/22* (2006.01)
*C08K 5/544* (2006.01)
(Continued)

(52) U.S. Cl.
CPC ............ *C08K 5/544* (2013.01); *C07F 7/1892* (2013.01); *C08J 5/18* (2013.01); *C08K 3/22* (2013.01); *C08K 9/06* (2013.01); *C09C 3/12* (2013.01); *C09D 179/08* (2013.01); *G02B 1/04* (2013.01); *C08J 2379/08* (2013.01);
(Continued)

(58) Field of Classification Search
CPC .. C08K 3/22; C08K 5/544; C08K 2003/2241; C07F 7/08; C07F 7/1892; C08J 5/18; C08J 2379/08; G02B 1/04; B32B 9/00
See application file for complete search history.

(56) References Cited

U.S. PATENT DOCUMENTS

| 5,270,352 A | 12/1993 | Carpenter et al. |
| 2006/0216438 A1* | 9/2006 | Nishimura ............. G02B 1/105 428/1.31 |

(Continued)

FOREIGN PATENT DOCUMENTS

| EP | 0406731 A2 * | 1/1991 | .......... C09C 1/0015 |
| JP | 2015131937 A | 7/2015 | |

(Continued)

OTHER PUBLICATIONS

Gong et al., "Preparation and performances of nanosized transparent and heat insulating composite coatings.", Acta Energiae Solaris Sinica, vol. 32, No. 8, Aug. 31, 2011 (Aug. 31, 2011), pp. 1195-1199, XP002782279.

(Continued)

*Primary Examiner* — Bijan Ahvazi
(74) *Attorney, Agent, or Firm* — Cantor Colburn LLP

(57) ABSTRACT

A polymer composition includes a polymer, a nanostructured filler, and a silane dispersing agent represented by Chemical Formula 1:

$$R^1-(Ar)_p-(O-L^1)_q-(O-L^2)_r-(O-L^3-O-L^4)_s-O-(L^5)_t-(L^6)_u-(CR^2R^3)_w-Si(R^4R^5R^6) \quad \text{Chemical Formula 1}$$

wherein, in Chemical Formula 1, $R^1$ to $R^6$, Ar, $L^1$ to $L^6$, p, q, r, s, t, and w are the same as described in the detailed description.

22 Claims, 4 Drawing Sheets

(51) Int. Cl.
    *C07F 7/18*     (2006.01)
    *C08J 5/18*     (2006.01)
    *G02B 1/04*     (2006.01)
    *C09C 3/12*     (2006.01)
    *C09D 179/08*     (2006.01)
    *C08K 9/06*     (2006.01)

(52) U.S. Cl.
    CPC ............... *C08K 2003/2241* (2013.01); *C08K 2201/003* (2013.01); *C08K 2201/011* (2013.01)

(56) References Cited

U.S. PATENT DOCUMENTS

2007/0092758 A1*   4/2007   Lee ..................... C09K 11/025
                                                                                          428/690
2007/0160826 A1    7/2007   Wang et al.
2016/0297928 A1*  10/2016   Ernst ..................... C04B 28/02

FOREIGN PATENT DOCUMENTS

JP         2015163671 A     9/2015
KR      1020110073084     6/2011

OTHER PUBLICATIONS

Extended European Search Report dated Jul. 20, 2018, of the corresponding European Patent Application No. 18160263.2.

* cited by examiner

POLYMER COMPOSITION AND POLYMER COMPOSITE AND OPTICAL FILM

CROSS-REFERENCE TO RELATED APPLICATION

This application claims priority to and the benefit of Korean Patent Application No. 10-2017-0030151, filed in the Korean Intellectual Property Office on Mar. 9, 2017, and all the benefits accruing therefrom under 35 U.S.C. § 119, the entire content of which is incorporated herein by reference.

BACKGROUND

1. Field

A polymer composition, a polymer composite, and an optical film are disclosed.

2. Description of the Related Art

Commonly used flat panel displays may be classified into a light-emitting display device emitting light by itself and a non-emissive display device requiring a separate light source and an optical film. The optical film is employed for improving the image quality thereof.

The optical film may be a polymer film, and the polymer film may include a nanostructured filler in addition to a polymer, in order to satisfy various properties.

However, the nanostructured filler may become agglomerated in a polymer and result in deteriorated optical characteristics. Thus, there remains a need for polymer compositions having nanostructured fillers prevent from agglomeration in a polymer.

SUMMARY

An embodiment provides a polymer composition capable of improving optical characteristic by increasing dispersibility of a nanostructured filler.

Another embodiment provides a polymer composite capable of improving optical characteristic by increasing dispersibility of a nanostructured filler.

Yet another embodiment provides an optical film including the polymer composite.

According to an embodiment, a polymer composition includes a polymer, a nanostructured filler, and a silane dispersing agent represented by Chemical Formula 1.

$$R^1-(Ar)_p-(O-L^1)_q-(O-L^2)_r-(O-L^3-O-L^4)_s-O-(L^5)_t-(L^6)_u-(CR^2R^3)_w-Si(R^4R^5R^6) \quad \text{Chemical Formula 1}$$

In Chemical Formula 1, $R^1$ is a substituted or unsubstituted C1 to C30 alkyl group, each $R^2$ and $R^3$ are the same or different, and are each independently hydrogen, a substituted or unsubstituted C1 to C30 alkyl group, a substituted or unsubstituted C1 to C30 alkoxy group, a hydroxy group, or a halogen, $R^4$ to $R^6$ are each independently hydrogen, a substituted or unsubstituted C1 to C30 alkyl group, a substituted or unsubstituted C1 to C30 alkoxy group, a hydroxy group, or a halogen, provided that at least one of $R^4$ to $R^6$ is a substituted or unsubstituted C1 to C30 alkoxy group, a hydroxy group, or a halogen, each Ar is the same or different, and is a substituted or unsubstituted C3 to C30 cycloalkylene group or a substituted or unsubstituted C6 to C30 arylene group, each $L^1$ to $L^4$ are the same or different, and are each independently a C1 to C5 alkylene group, each $L^5$ is the same or different, and is O, C(=O), C(=O)O, C(=O)$NR^a$, or a combination thereof, wherein $R^a$ is hydrogen or a substituted or unsubstituted C1 to C20 alkyl group, each $L^6$ is the same or different, and is a substituted or unsubstituted C1 to C30 oxyalkylene group, p, t, and u are each independently 0 or 1, q, r, and s are each independently an integer ranging from 0 to 30, provided that 2≤q+r+s≤30, and w is an integer ranging from 0 to 10.

The silane dispersing agent may be represented by Chemical Formula 2.

Chemical Formula 2

$$R^1-(Ar)_p-[O\diagdown]_q-O-\overset{O}{\underset{}{C}}-\underset{H}{N}-[\diagdown]_{t1}-[O\diagdown]_{t2}-[L^6]_u-(CH_2)_w-Si-R^5\ (R^4, R^6)$$

In Chemical Formula 2, $R^1$ is a substituted or unsubstituted C1 to C30 alkyl group, $R^4$ to $R^6$ are each independently hydrogen, a substituted or unsubstituted C1 to C30 alkyl group, a substituted or unsubstituted C1 to C30 alkoxy group, a hydroxy group, or a halogen, provided that at least one of $R^4$ to $R^6$ is a substituted or unsubstituted C1 to C30 alkoxy group, a hydroxy group, or a halogen, each Ar is the same or different, and is a substituted or unsubstituted C3 to C30 cycloalkyl group or a substituted or unsubstituted C6 to C30 aryl group, each $L^6$ is the same or different, and is a substituted or unsubstituted C1 to C30 oxyalkylene group, p, t1, t2, and u are each independently 0 or 1, q is an integer ranging from 2 to 30, and w is an integer ranging from 0 to 10.

The Ar may be a substituted or unsubstituted phenylene group (i.e., benzene ring) or a substituted or unsubstituted cyclohexylene group.

The $R^4$ to $R^6$ each independently may be a substituted or unsubstituted C1 to C30 alkoxy group.

The silane dispersing agent may be represented by one of Chemical Formulae 1a to 1e.

Chemical Formula 1a

Chemical Formula 1b

-continued

Chemical Formula 1c

Chemical Formula 1d

Chemical Formula 1e

In Chemical Formulae 1a to 1e,
$R^7$ to $R^9$ are independently a methyl group or an ethyl group,
t1 is 0 or 1,
q is an integer ranging from 2 to 30, and
m is an integer ranging from 1 to 25.

The silane dispersing agent may be bound to a surface of the nanostructured filler.

The nanostructured filler may include an inorganic nanoparticle, an inorganic nanorod, an inorganic nanoplate, an inorganic nanowire, an inorganic nanoflake, an inorganic nanotube, an inorganic nanocapsule, or a combination thereof.

The nanostructured filler may include $TiO_2$, $ZrO_2$, $BaTiO_3$, $SrTiO_3$, $Cu_2O$, $CuO$, $Cr_2O_3$, $Fe_2O_3$, $Mn_3O_4$, $MnO_2$, NiO, ZnO, or a combination thereof.

The nanostructured filler may have a long diameter of less than or equal to about 100 nanometers (nm).

The polymer may include a polyolefin, a polyamide, a polyimide, a polyester, a poly(meth)acryl, polystyrene, an epoxy, a polycarbonate, a polysiloxane, a polyurethane, a copolymer thereof, or a combination thereof.

The polymer may include polyethylene, polypropylene, a polyimide, polyethylene terephthalate (PET), polyethylene terephthalate glycol (PETG), polyethylene naphthalate (PEN), a nylon, polydimethylsiloxane, a polyurethane, a copolymer thereof, or a combination thereof.

According to another embodiment, a polymer composition includes a polymer and a modified nanostructured filler, wherein the modified nanostructured filler includes a nanostructured filler and a silane dispersing agent represented by Chemical Formula 1' bound to a surface of the nanostructured filler.

Chemical Formula 1'

In Chemical Formula 1',
$R^1$ is a substituted or unsubstituted C1 to C30 alkyl group,
each $R^2$ and $R^3$ are the same or different, and are each independently hydrogen, a substituted or unsubstituted C1 to C30 alkyl group, a substituted or unsubstituted C1 to C30 alkoxy group, a hydroxy group, or a halogen, $R^{4'}$ to $R^{6'}$ are each independently hydrogen, a substituted or unsubstituted C1 to C30 alkyl group, or a group of the formula (—O—*) wherein * is a binding site to the surface of the nanostructured filler by a condensation reaction, provided that at least one of $R^{4'}$ to $R^{6'}$ is the binding site to the surface of the nanostructured filler by the condensation reaction,
each Ar is the same or different, and is a substituted or unsubstituted C3 to C30 cycloalkylene group or a substituted or unsubstituted C6 to C30 arylene group,
each $L^1$ to $L^4$ are the same or different, and are each independently a C1 to C5 alkylene group,
each $L^5$ is the same or different, and is O, C(=O), C(=O)O, C(=O)$NR^a$, or a combination thereof, wherein $R^a$ is hydrogen or a substituted or unsubstituted C1 to C20 alkyl group,
each $L^6$ is the same or different, and is a substituted or unsubstituted C1 to C30 oxyalkylene group,
p, t, and u are each independently 0 or 1,
q, r, and s are each independently an integer ranging from 0 to 30, provided that 2≤q+r+s≤30, and
w is an integer ranging from 0 to 10.

The silane dispersing agent may be represented by Chemical Formula 2'.

Chemical Formula 2'

In Chemical Formula 2',
$R^1$ is a substituted or unsubstituted C1 to C30 alkyl group,
each $L^6$ is the same or different, and is a substituted or unsubstituted C1 to C30 oxyalkylene group,
$R^{4'}$ to $R^{6'}$ are each independently hydrogen, a substituted or unsubstituted C1 to C30 alkyl group, or the binding site to the surface of the nanostructured filler by the condensation reaction, provided that at least one of $R^{4'}$ to $R^{6'}$ is the binding site to the surface of the nanostructured filler by the condensation reaction,
each Ar is the same or different, and is a substituted or unsubstituted C3 to C30 cycloalkylene group or a substituted or unsubstituted C6 to C30 arylene group,
p, t1, t2, and u are each independently 0 or 1,
q is an integer ranging from 2 to 30, and
w is an integer ranging from 0 to 10.

In Chemical Formula 1', each Ar may be the same or different, and may be a substituted or unsubstituted phenylene group or a substituted or unsubstituted cyclohexylene group.

The $R^{4'}$ to $R^{6'}$ each may be binding sites to the surface of the nanostructured filler by the condensation reaction.

The silane dispersing agent may be represented by one of Chemical Formulae 1a' to 1e'.

Chemical Formula 1a'

-continued

In Chemical Formula 1a' to 1e',
t1 is 0 or 1,
q is an integer ranging from 2 to 30,
m is an integer ranging from 1 to 25, and
* is the binding site to the surface of the nanostructured filler.

The nanostructured filler may include an inorganic nanoparticle, an inorganic nanorod, an inorganic nanoplate, an inorganic nanowire, an inorganic nanoflake, an inorganic nanotube, an inorganic nanocapsule, or a combination thereof.

The nanostructured filler may include $TiO_2$, $ZrO_2$, $BaTiO_3$, $SrTiO_3$, $Cu_2O$, $CuO$, $Cr_2O_3$, $Fe_2O_3$, $Mn_3O_4$, $MnO_2$, $NiO$, $ZnO$, or a combination thereof.

The nanostructured filler may have a long diameter of less than or equal to about 100 nanometers (nm).

The modified nanostructured filler may be included in an amount of about 0.1 volume percent (volume %) to 20 volume % based on a total volume of the polymer and the modified nanostructured filler.

The polymer may include a polyolefin, a polyamide, a polyimide, a polyester, a poly(meth)acryl, polystyrene, an epoxy, a polycarbonate, a polysiloxane, a polyurethane, a copolymer thereof, or a combination thereof.

The polymer may include a polyethylene, a polypropylene, a polyamide, a polyimide, a polyethylene terephthalate (PET), a polyethylene terephthalate glycol (PETG), a polyethylene naphthalate (PEN), a nylon, a polydimethylsiloxane, a polyurethane, a copolymer thereof, or a combination thereof.

According to another embodiment, a polymer composite includes the polymer composition, wherein the nanostructured filler and the silane dispersing agent are dispersed in the polymer.

The nanostructured filler and the silane dispersing agent may be included in an amount of about 0.1 volume % to about 20 volume % based on a total volume of the polymer composite.

The polymer composite may be a film form, and the polymer composite may satisfy a visible light transmittance of greater than or equal to about 85% at a wavelength of 450 nanometers, a haze of less than about 1 as determined according to ASTM D1003-07, and a yellow index of less than or equal to about 3.5, as determined according to ASTM D1925.

According to another embodiment, an optical film includes the polymer composite.

The optical film may satisfy a visible light transmittance of greater than or equal to about 85% at a wavelength of 450 nanometers, a haze of less than about 1 as determined according to ASTM D1003-07, and a yellow index of less than or equal to about 3.5, as measured according to ASTM D1925.

In another embodiment, a polymer composite includes the polymer composition wherein the modified nanostructured filler is dispersed in the polymer.

The modified nanostructured filler may be included in an amount of about 0.1 volume % to about 20 volume % based on a total volume of the polymer composite.

The polymer composite may be in a film form, and satisfy a visible light transmittance of greater than or equal to about 85% at a wavelength of 450 nanometers, a haze of less than about 1 as determined according to ASTM D1003-07, and a yellow index of less than or equal to about 3.5, as determined according to ASTM D1925.

In another embodiment, an optical film includes the polymer composite including the polymer and the modified nanostructured filler.

Optical characteristics of the polymer composite may be improved by increasing dispersibility of a nanostructured filler or a modified nanostructured filler in a polymer, and thus the polymer composite may be effectively applied to an optical film.

BRIEF DESCRIPTION OF THE DRAWINGS

These and/or other aspects will become more apparent and more readily appreciated from the following description of exemplary embodiments, taken with reference to the accompanying drawings, wherein.

DETAILED DESCRIPTION

Exemplary embodiments of the present disclosure will hereinafter be described in detail, and may be performed by a person skilled in the art. However, this disclosure may be embodied in many different forms and is not construed as limited to the exemplary embodiments set forth herein.

The terminology used herein is for the purpose of describing particular embodiments only and is not intended to be limiting. As used herein, the singular forms "a," "an" and "the" are intended to include the plural forms as well, unless the context clearly indicates otherwise. The term "or" means "and/or." As used herein, the term "and/or" includes any and all combinations of one or more of the associated listed items. Expressions such as "at least one of," when preceding a list of elements, modify the entire list of elements and do not modify the individual elements of the list.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer, or section. Thus, a first element, component, region, layer, or section discussed below could be termed a second element, component, region, layer, or section without departing from the teachings of the present embodiments.

It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this general inventive concept belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, when a definition is not otherwise provided, the term 'substituted' refers to replacement of a hydrogen atom of a group or compound by a substituent including a halogen, a hydroxy group, an alkoxy group, a nitro group, a cyano group, an amino group, an azido group, an amidino group, a hydrazino group, a hydrazono group, a carbonyl group, a carbamyl group, a thiol group, an ester group, a carboxyl group or a salt thereof, a sulfonic acid group or a salt thereof, a phosphoric acid or a salt thereof, a C1 to C20 alkyl group, a C2 to C20 alkenyl group, a C2 to C20 alkynyl group, a C6 to C30 aryl group, a C7 to C30 arylalkyl group, a C1 to C30 alkoxy group, a C1 to C20 heteroalkyl group, a C3 to C20 heteroarylalkyl group, a C3 to C30 cycloalkyl group, a C3 to C15 cycloalkenyl group, a C6 to C15 cycloalkynyl group, a C3 to C30 heterocycloalkyl group, or a combination thereof.

As used herein, when a definition is not otherwise provided, the term "hetero" refers to a compound or group including 1 to 4 heteroatoms selected from N, O, S, Se, Te, Si, and P.

As used herein, the term "alkyl" group refers to a straight or branched chain saturated monovalent hydrocarbon having the specified number of carbon atoms. The term "alkylene" group means a straight or branched chain saturated divalent hydrocarbon having the indicated number of carbon atoms.

As used herein, the term "alkenyl" group refers to a straight or branched chain monovalent hydrocarbon that comprises at least one carbon-carbon double bond, having the specified number of carbon atoms.

As used herein, the term "alkynyl" group refers to a straight or branched chain, monovalent hydrocarbon group having at least one carbon-carbon triple bond, having the specified number of carbon atoms.

As used herein, the term "cycloalkyl" group refers to a monovalent group that comprises one or more saturated and/or partially saturated rings in which all ring members are carbon, such as cyclopropyl, cyclobutyl, cyclopentyl, cyclohexyl, cycloheptyl, cyclooctyl, adamantyl, and partially saturated variants of the foregoing, such as cycloalkenyl groups (e.g., cyclohexenyl) or cycloalkynyl groups. As used herein, the term "cycloalkylene" group means a divalent group that comprises saturated and/or partially saturated ring or rings.

As used herein, the term "alkoxy" group means a monovalent alkyl group as defined above with the indicated number of carbon atoms attached through an oxygen bridge. As used herein, the term "oxyalkylene" group means a divalent alkoxy group with the indicated number of carbon atoms attached through a carbon atom and an oxygen bridge.

As used herein, the term "aryl" group refers to a monovalent cyclic group in which all ring members are carbon and at least one ring is aromatic, the group having the specified number of carbon atoms. More than one ring may be present, and any additional rings may be independently aromatic, saturated or partially unsaturated, and may be fused, pendant, spirocyclic, or a combination thereof. As used herein, the term "arylene" group means a divalent cyclic group in which all ring members are carbon and at least one ring is aromatic.

As used herein, when a definition is not otherwise provided, the term "(meth)acryl" refers to acryl and/or methacryl. The acryl or methacryl can be an ester (e.g., a (C1 to C6 alkyl)(meth)acrylate) or an acid or a salt thereof (e.g., a methacrylic acid or a salt thereof).

Hereinafter, a silane dispersing agent according to an embodiment is described.

A silane dispersing agent according to an embodiment is represented by Chemical Formula 1.

$R^1$—$(Ar)_p$—$(O-L^1)_q$-$(O-L^2)_r$-$(O-L^3-O-L^4)_s$-$(O-L^5)_t$-$(L^6)_u$-$(CR^2R^3)_w$—$Si(R^4R^5R^6)$   Chemical Formula 1

In Chemical Formula 1, $R^1$ is a substituted or unsubstituted C1 to C30 alkyl group, each $R^2$ and $R^3$ are the same or different, and are each independently hydrogen, a substituted or unsubstituted C1 to C30 alkyl group, a substituted or unsubstituted C1 to C30 alkoxy group, a hydroxy group, or a halogen, $R^4$ to $R^6$ are each independently hydrogen, a substituted or unsubstituted C1 to C30 alkyl group, a substituted or unsubstituted C1 to C30 alkoxy group, a hydroxy group, or a halogen, provided that at least one of $R^4$ to $R^6$ is a substituted or unsubstituted C1 to C30 alkoxy group, a hydroxy group, or a halogen, each Ar is the same or different, and is a substituted or unsubstituted C3 to C30 cycloalkylene group or a substituted or unsubstituted C6 to C30 arylene group, each $L^1$ to $L^4$ are the same or different, and are each independently a C1 to C5 alkylene group, each $L^5$ is the same or different, and is O, C(=O), C(=O)O, C(=O)$NR^a$, or a combination thereof, wherein $R^a$ is hydrogen or a substituted or unsubstituted C1 to C20 alkyl group, each $L^6$ is the same or different, and is a substituted or unsubstituted C1 to C30 oxyalkylene group, p, t, and u are each independently 0 or 1, q, r, and s are each independently an integer ranging from 0 to 30, provided that 2≤q+r+s≤30, and w is an integer ranging from 0 to 10.

The silane dispersing agent according to an embodiment can be bound to a surface of the nanostructured filler, for example covalently bonded, and improve dispersibility of the nanostructured filler by including a silane moiety including at least one hydrolysable group (a hydrolysable functional group).

In addition, the silane dispersing agent according to an embodiment includes a hydrophobic moiety including an alkyl group and optionally an arylene group at the terminal end and a hydrophilic moiety including a linear alkylene oxide, and thus lengths of the hydrophobic moiety and the hydrophilic moiety may be effectively designed according to kinds of dispersion mediums and good dispersion characteristics may be realized in various dispersion mediums.

For example, $R^1$ of Chemical Formula 1 may be a substituted or unsubstituted C1 to C30 linear or branched alkyl group.

For example, $R^1$ of Chemical Formula 1 may be a substituted or unsubstituted C1 to C30 branched alkyl group.

For example, each $R^2$ and $R^3$ of Chemical Formula 1 may be the same or different, and each independently may be hydrogen or a substituted or unsubstituted C1 to C30 alkyl group.

For example, $R^4$ to $R^6$ of Chemical Formula 1 may each independently be a substituted or unsubstituted C1 to C30 alkoxy group, a hydroxy group, or a halogen.

For example, $R^4$ to $R^6$ of Chemical Formula 1 may each independently be a substituted or unsubstituted C1 to C30 alkoxy group.

For example, each Ar of Chemical Formula 1 may be the same or different, and may be a substituted or unsubstituted phenylene group or a substituted or unsubstituted cyclohexylene group.

For example, each $L^1$ to $L^4$ of Chemical Formula 1 may be the same or different, and each independently may be an ethylene group or a propylene group.

For example, $L^6$ may be a substituted or unsubstituted C1 to C10 oxyalkylene group, and in some embodiments may be a substituted C1 to C6 group. In these embodiments, t2 may be 0, and u may be one. Further in these embodiments, $L^6$ may be substituted as described in the definitions herein. In some embodiments, $L^6$ may be substituted with a halogen, a hydroxy group, an alkoxy group, a nitro group, a cyano group, or an amino group.

For example, the silane dispersing agent may be represented by Chemical Formula 2.

In Chemical Formula 2, $R^1$ is a substituted or unsubstituted C1 to C30 alkyl group, $R^4$ to $R^6$ are each independently hydrogen, a substituted or unsubstituted C1 to C30 alkyl group, a substituted or unsubstituted C1 to C30 alkoxy group, a hydroxy group, or halogen, provided that at least one of $R^4$ to $R^6$ is a substituted or unsubstituted C1 to C30 alkoxy group, a hydroxy group, or a halogen, each Ar is the same or different, and is a substituted or unsubstituted C3 to C30 cycloalkyl group or a substituted or unsubstituted C6 to C30 aryl group, each $L^6$ is the same or different, and is a substituted or unsubstituted C1 to C30 oxyalkylene group, p, t1, t2, and u are each independently 0 or 1, q is an integer of 2 to 30, and w is an integer of 0 to 10.

For example, $R^1$ of Chemical Formula 2 may be a substituted or unsubstituted C1 to C30 linear or branched alkyl group.

For example, $R^1$ of Chemical Formula 2 may be a substituted or unsubstituted branched alkyl group.

For example, $R^4$ to $R^6$ of Chemical Formula 2 may each independently be a substituted or unsubstituted C1 to C30 alkoxy group, a hydroxy group, or a halogen.

For example, $R^4$ to $R^6$ of Chemical Formula 2 may each independently be a substituted or unsubstituted C1 to C30 alkoxy group.

For example, each Ar of Chemical Formula 2 may be the same or different, and may be a substituted or unsubstituted phenylene group or a substituted or unsubstituted cyclohexylene group.

For example, each $L^1$ to $L^4$ of Chemical Formula 2 may be the same or different, and each independently may be an ethylene group or a propylene group.

A silane dispersing agent according to an embodiment may be, for example, represented by one of Chemical Formulae 1a to 1e, but is not limited thereto.

Chemical Formula 2

$$R^1-(Ar)_p-[O\diagdown\diagup]_q-O-\underset{\underset{H}{N}}{\overset{\overset{O}{\|}}{C}}-[O]_{t2}-[L^6]_u-(CH_2)_w-\underset{\underset{R^6}{|}}{\overset{\overset{R^4}{|}}{Si}}-R^5$$

Chemical Formula 1a

[structure]

Chemical Formula 1b

[structure]

Chemical Formula 1c

[structure]

-continued

Chemical Formula 1d

Chemical Formula 1e

In Chemical Formula 1a to 1e,
R[7] to R[9] are each independently a methyl group or an ethyl group,
t1 is 0 or 1,
q is an integer of 2 to 30, and
m is an integer of 1 to 25.

The silane dispersing agent may have a molecular weight of about 200 to about 2,000 grams per mole (g/mol), for example about 500 to about 1,500 g/mol.

The nanostructured filler according to an embodiment is now described.

The nanostructured filler may be for example a nano-level structure including an inorganic material, an organic material, or an organic/inorganic material and may be a one-dimensional, two-dimensional, and/or three-dimensional shaped nanostructured filler.

The nanostructured filler may include for example a nanoparticle, a nanorod, a nanoplate, a nanowire, a nanoflake, a nanotube, a nanocapsule, or a combination thereof, but is not limited thereto.

For example, the nanostructured filler may be an inorganic nanoparticle, an inorganic nanorod, an inorganic nanoplate, an inorganic nanowire, an inorganic nanoflake, an inorganic nanotube, an inorganic nanocapsule, or a combination thereof, but is not limited thereto.

The nanostructured filler may be for example an oxide, a nitride, or an oxynitride, and may be for example a metal oxide, a semi-metal oxide, a metal nitride, a semi-metal nitride, a metal oxynitride, or a semi-metal oxynitride.

The nanostructured filler may be for example a metal oxide, a semi-metal oxide, a metal nitride, a semi-metal nitride, a metal oxynitride, or a semi-metal oxynitride having a high refractive index, for example a metal oxide or a semi-metal oxide having a refractive index of greater than or equal to about 2.0, for another example a metal oxide or a semi-metal oxide having a refractive index of about 2.0 to about 2.8.

The nanostructured filler may include for example $TiO_2$, $ZrO_2$, $BaTiO_3$, $SrTiO_3$, $Cu_2O$, $CuO$, $Cr_2O_3$, $Fe_2O_3$, $Mn_3O_4$, $MnO_2$, $NiO$, $ZnO$, or a combination thereof, but is not limited thereto.

The nanostructured filler may have for example a long diameter of less than or equal to about 200 nm, for example a long diameter of about 5 nm to about 100 nm, about 5 nm to about 80 nm, or about 5 nm to about 50 nm.

Herein, the long diameter may be a diameter in case of a spherical shape and it may be a length of the longest part (largest dimension) of a height, a width, or a thickness in the case of a non-spherical shape.

The nanostructured filler and the silane dispersing agent may be included in an amount of about 0.01 volume % to about 20 volume % based on a total (solid) volume of the polymer composition.

Within the range, the nanostructured filler and the silane dispersing agent may be included in an amount of about 2.0 volume % to about 15.0 volume % based on a total volume of the polymer composition.

The polymer composition may optionally include a solvent.

The solvent is not particularly limited if it dissolves and/or disperses the polymer and the nanostructured filler or the modified nanostructured filler and may be for example one or more selected from water; an alcohol solvent such as methanol, ethanol, n-propanol, isopropanol, n-butanol, isobutanol, t-butanol, propylene glycol, propylene glycolmethylether, ethylene glycol, and the like; an aliphatic hydrocarbon solvent such as hexane, heptane, and the like; an aromatic hydrocarbon solvent such as toluene, pyridine, quinoline, anisole, mesitylene, xylene, and the like; a ketone solvent such as methyl isobutyl ketone, 1-methyl-2-pyrrolidinone (NMP), cyclohexanone, acetone, and the like; an ether solvent such as tetrahydrofuran, isopropyl ether, and the like; an acetate solvent such as ethyl acetate, butyl acetate, propylene glycol methyl ether acetate, and the like; an amide solvent such as dimethyl acetamide, dimethyl formamide (DMF), and the like; a nitrile solvent such as acetonitrile, benzonitrile, and the like; and a mixture of the foregoing solvents, but is not limited thereto.

Hereinafter, a modified nanostructured filler according to an embodiment is described.

The modified nanostructured filler according to an embodiment includes a nanostructured filler and a silane dispersing agent bound to a surface of the nanostructured filler.

The nanostructured filler may be for example a nano-level structure including an inorganic material, an organic material, or an organic/inorganic material and may be a one-dimensional, two-dimensional, and/or three-dimensional shaped nanostructured filler.

The nanostructured filler may include for example a nanoparticle, a nanorod, a nanoplate, a nanowire, a nanoflake, a nanotube, a nanocapsule, or a combination thereof, but is not limited thereto.

For example, the nanostructured filler may be an inorganic nanoparticle, an inorganic nanorod, an inorganic nanoplate, an inorganic nanowire, an inorganic nanoflake, an inorganic nanotube, an inorganic nanocapsule, or a combination thereof, but is not limited thereto.

The nanostructured filler may be for example an oxide, a nitride, or an oxynitride, and may be for example a metal oxide, a semi-metal oxide, a metal nitride, a semi-metal nitride, a metal oxynitride, or a semi-metal oxynitride.

The nanostructured filler may be for example a metal oxide, a semi-metal oxide, a metal nitride, a semi-metal nitride, a metal oxynitride, or a semi-metal oxynitride having a high refractive index, for example a metal oxide or a semi-metal oxide having a refractive index of greater than or equal to about 2.0, for another example a metal oxide or a semi-metal oxide having a refractive index of about 2.0 to about 2.8.

The nanostructured filler may include for example $TiO_2$, $ZrO_2$, $BaTiO_3$, $SrTiO_3$, $Cu_2O$, $CuO$, $Cr_2O_3$, $Fe_2O_3$, $Mn_3O_4$, $MnO_2$, $NiO$, $ZnO$, or a combination thereof, but is not limited thereto.

The nanostructured filler may have for example a long diameter of less than or equal to about 200 nm, for example a long diameter of about 5 nm to about 100 nm, about 5 nm to about 80 nm, or about 5 nm to about 50 nm.

Herein, the long diameter may be a diameter in case of a spherical shape and it may be a length of the longest part of a height, a width, and a thickness in case of a non-spherical shape. The modified nanostructured filler may be a nanostructured filler where at least one part of its surface is modified by a silane dispersing agent, and for example at least one part of the surface of the nanostructured filler may be chemically bound, for example covalently bonded, by a condensation reaction with a hydrolysable group of the silane dispersing agent.

The silane dispersing agent bound to the nanostructured filler may be a condensation reaction product of the silane dispersing agent represented by Chemical Formula 1 with a surface of the nanostructured filler, and may be for example represented by Chemical Formula 1'.

Chemical Formula 1'

In Chemical Formula 1', $R^1$ is a substituted or unsubstituted C1 to C30 alkyl group, each $R^2$ and $R^3$ are the same or different, and are each independently hydrogen, a substituted or unsubstituted C1 to C30 alkyl group, a substituted or unsubstituted C1 to C30 alkoxy group, a hydroxy group, or a halogen, $R^{4'}$ to $R^{6'}$ are each independently hydrogen, a substituted or unsubstituted C1 to C30 alkyl group, or a group of the formula (—O—*) wherein * is a binding site to the surface of the nanostructured filler by a condensation reaction, provided that at least one of $R^{4'}$ to $R^{6'}$ is the binding site to the surface of the nanostructured filler by the condensation reaction, each Ar is the same or different, and is a substituted or unsubstituted C3 to C30 cycloalkylene group or a substituted or unsubstituted C6 to C30 arylene group, each $L^1$ to $L^4$ are the same or different, and are each independently a C1 to C5 alkylene group, each $L^5$ is the same or different, and is O, C(=O), C(=O)O, or C(=O)$NR^a$, wherein $R^a$ is hydrogen or a substituted or unsubstituted C1 to C20 alkyl group, each $L^6$ is the same or different, and is a substituted or unsubstituted C1 to C30 oxyalkylene group, p, t, and u are each independently 0 or 1, q, r, and s are each independently an integer of 0 to 30, provided that 2≤q+r+s≤30, and w is an integer of 0 to 10.

For example, $R^1$ of Chemical Formula 1' may be a substituted or unsubstituted C1 to C30 linear or branched alkyl group.

For example, $R^1$ of Chemical Formula 1' may be a substituted or unsubstituted branched alkyl group.

For example, each $R^2$ and $R^3$ of Chemical Formula 1' may be the same or different, and may each independently be hydrogen or a substituted or unsubstituted C1 to C30 alkyl group.

For example, $R^4$ to $R^6$ of Chemical Formula 1' may each independently be a binding site to the surface of the nanostructured filler by a condensation reaction.

For example, each Ar of Chemical Formula 1' may be the same or different, and may be a substituted or unsubstituted phenylene group or a substituted or unsubstituted cyclohexylene group.

For example, each $L^1$ to $L^4$ of Chemical Formula 1' may be the same or different, and each independently may be an ethylene group or a propylene group.

For example, the silane dispersing agent bound to the surface of the nanostructured filler may be represented by Chemical Formula 2'.

Chemical Formula 2'

In Chemical Formula 2', $R^1$ is a substituted or unsubstituted C1 to C30 alkyl group, $R^{4'}$ to $R^{6'}$ are each independently hydrogen, a substituted or unsubstituted C1 to C30 alkyl group, or a group of the formula (—O—*) wherein * is a binding site to the surface of the nanostructured filler by a condensation reaction, provided that at least one of $R^{4'}$ to $R^{6'}$ is the binding site to the nanostructured filler by the condensation reaction, each Ar is the same or different, and is a substituted or unsubstituted C3 to C30 cycloalkylene group or a substituted or unsubstituted C6 to C30 arylene group, p, t1, t2, and u are each independently 0 or 1, q is an integer of 2 to 30, and w is an integer of 0 to 10.

For example, $R^1$ of Chemical Formula 2' may be a substituted or unsubstituted C1 to C30 linear or branched alkyl group.

For example, $R^1$ of Chemical Formula 2' may be a substituted or unsubstituted branched alkyl group.

For example, $R^{4'}$ to $R^{6'}$ of Chemical Formula 2' may each be binding sites to the surface of the nanostructured filler by each condensation reaction.

For example, each Ar of Chemical Formula 2' may be the same or different, and may be a substituted or unsubstituted phenylene group or a substituted or unsubstituted cyclohexylene group.

For example, each $L^1$ to $L^4$ of Chemical Formula 2' may be the same or different, and each independently may be an ethylene group or a propylene group.

The silane dispersing agent bound to the surface of the nanostructured filler may be for example represented by one of Chemical Formulae 1a' to 1e', but is not limited thereto.

Chemical Formula 1a'

Chemical Formula 1b'

Chemical Formula 1c'

Chemical Formula 1d'

Chemical Formula 1e'

In Chemical Formula 1a' to 1e',
t1 is 0 or 1,
q is an integer of 2 to 30,
m is an integer of 1 to 25, and
* is the binding site to the surface of the nanostructured filler.

The modified nanostructured filler according to an embodiment increases dispersibility in a dispersion medium, and thus reduces or prevents agglomeration.

In addition, the silane dispersing agent bound to the surface of the nanostructured filler includes a hydrophobic moiety including an alkyl group and optionally an arylene group at the terminal end and a hydrophilic moiety including a linear alkylene oxide, and thus lengths of the hydrophobic moiety and the hydrophilic moiety may be effectively designed according to kinds of dispersion mediums and good dispersion characteristics may be realized in various dispersion mediums.

Accordingly, the modified nanostructured filler according to an embodiment may be effectively employed regardless of kinds of the dispersion mediums and has various application ranges.

Hereinafter, a polymer composition is described.

A polymer composition according to an embodiment includes a polymer, a nanostructured filler, and the silane dispersing agent.

A polymer composition according to another embodiment includes a polymer and the modified nanostructured filler.

The polymer may be for example a hydrophilic polymer or a hydrophobic polymer, for example a hydrophobic polymer.

The polymer may include for example a polyolefin, a polyamide, a polyimide, a polyester, a poly(meth)acryl, polystyrene, an epoxy, a polycarbonate, a polysiloxane, a polyurethane, a copolymer thereof, or a combination thereof, but is not limited thereto.

The polymer may include for example polyethylene, polypropylene, a polyamide, a polyimide, polyethylene terephthalate (PET), polyethylene terephthalate glycol (PETG), polyethylene naphthalate (PEN), a nylon, polydimethylsiloxane, a polyurethane, a copolymer thereof, or a combination thereof, but is not limited thereto.

The polymer may be included in an amount of greater than or equal to about 80 volume % based on a total (solid) volume of the polymer composition.

Within the range, the polymer may be included in an amount of about 80 volume % to about 99.9 volume % based on a total volume of the polymer composition.

Within the range, the polymer may be included in an amount of about 85 volume % to about 98 volume % based on a total volume of the polymer composition.

The modified nanostructured filler may be included in an amount of about 0.01 volume % to about 20 volume % based on a total volume of the polymer composition.

Within the range, the modified nanostructured filler may be included in an amount of about 2.0 volume % to about 15.0 volume % based on a total volume of the polymer composition.

The polymer composition may optionally include a solvent.

The solvent is not particularly limited if it dissolves and/or disperses the polymer and the nanostructured filler or the modified nanostructured filler and may be for example one or more selected from water; an alcohol solvent such as methanol, ethanol, n-propanol, isopropanol, n-butanol, isobutanol, t-butanol, propylene glycol, propylene glycolmethylether, ethylene glycol, and the like; an aliphatic hydrocarbon solvent such as hexane, heptane, and the like; an aromatic hydrocarbon solvent such as toluene, pyridine, quinoline, anisole, mesitylene, xylene, and the like; a ketone solvent such as methyl isobutyl ketone, 1-methyl-2-pyrrolidinone (NMP), cyclohexanone, acetone, and the like; an ether solvent such as tetrahydrofuran, isopropyl ether, and the like; an acetate solvent such as ethyl acetate, butyl acetate, propylene glycol methyl ether acetate, and the like; an amide solvent such as dimethyl acetamide, dimethyl formamide (DMF), and the like; a nitrile solvent such as acetonitrile, benzonitrile, and the like; and a mixture of the foregoing solvents, but is not limited thereto.

As described above, the modified nanostructured filler may be substantially uniformly dispersed in the polymer of the polymer composition due to high dispersibility, and accordingly generation of precipitates or floating materials by excessive agglomeration may be reduced or prevented, and thus it may be present in an optically transparent dispersion form. Similarly, the nanostructured filler and the silane dispersing agent may be substantially uniformly dispersed in the polymer of the polymer composition in an optically transparent dispersion form.

The polymer composition may be formed into a polymer composite.

The polymer composite may include a polymer and a modified nanostructured filler dispersed in the polymer. Alternatively, the polymer composite may include the polymer composition comprising the polymer, the nanostructured filler, and the silane dispersing agent, wherein the nanostructured filler and the silane dispersing agent are dispersed in the polymer.

The polymer may be for example a hydrophilic polymer or a hydrophobic polymer, for example a hydrophobic polymer.

The polymer may include for example a polyolefin, a polyamide, a polyimide, a polyester, poly(meth)acryl, polystyrene, an epoxy, a polycarbonate, a polysiloxane, a polyurethane, a copolymer thereof, or a combination thereof, but is not limited thereto.

The polymer may include for example polyethylene, polypropylene, a polyimide, polyethylene terephthalate (PET), polyethylene terephthalate glycol (PETG), polyethylene naphthalate (PEN), a nylon, polydimethylsiloxane, a polyurethane, a copolymer thereof, or a combination thereof, but is not limited thereto.

The nanostructured filler and the silane dispersing agent may be included in an amount of about 0.1 volume % to about 20 volume % based on a total volume of the polymer composite.

Within the range, the nanostructured filler and the silane dispersing agent may be included in an amount of about 2 volume % to about 15 volume % based on a total volume of the polymer composite.

The modified nanostructured filler may be included in an amount of about 0.1 volume % to about 20 volume % based on a total volume of the polymer composite.

Within the range, the modified nanostructured filler may be included in an amount of about 2 volume % to about 15 volume % based on a total volume of the polymer composite.

The polymer composite may be for example prepared in a film form, may be used as a polymer film, and may be for example transparent.

The polymer composite may be for example a transparent film having a thickness of about 0.1 micrometers ($\mu m$) to about 500 $\mu m$, for example about 1 $\mu m$ to about 300 $\mu m$, about 1 $\mu m$ to about 200 $\mu m$, or about 2 $\mu m$ to about 150 $\mu m$.

The polymer composite may be for example a transparent film satisfying a visible light transmittance of greater than or equal to about 85% at a wavelength of 450 nanometers, a haze of less than about 1 as determined according to ASTM D1003-07, and a yellow index of less than or equal to about 3.5 as determined according to ASTM D1925.

The polymer composite may be for example a transparent film satisfying a visible light transmittance of greater than or equal to about 87% at a wavelength of 450 nanometers, a haze of less than about 0.8 as determined according to ASTM D1003-07, and a yellow index of less than or equal to about 3.0 as determined according to ASTM D1925.

The polymer composite may be applied in any use requiring transparency.

The polymer composite may be for example used as a substrate, a protective film, an optical film, a dielectric layer, an insulation layer, an adhesive layer, and the like.

For example, the polymer composite may be used as an optical film.

The optical film may for example satisfy a visible light transmittance of greater than or equal to about 85% at a wavelength of 450 nanometers, a haze of less than about 1 as determined according to ASTM D1003-07, and a yellow index of less than or equal to about 3.5 as determined according to ASTM D1925, for example a light transmittance of greater than or equal to about 88% at a wavelength of 450 nanometers, a haze of less than about 0.8 as determined according to ASTM D1003-07, and a yellow index of less than or equal to about 3.0 as determined according to ASTM D1925.

The optical film may be for example a compensation film.

The compensation film may be for example elongated in a uniaxial or biaxial direction and may have a predetermined retardation.

The retardation of the compensation film may be expressed as in-plane retardation ($R_o$) and a thickness direction retardation ($R_{th}$).

The in-plane retardation ($R_o$) of the compensation film is a retardation generated in the plane of the compensation film and may be expressed by Equation 1:

$$R_o = (n_x - n_y)d \qquad \text{Equation (1)}$$

The thickness direction retardation ($R_{th}$) of the compensation film is a retardation generated in a thickness direction of the compensation film and may be expressed by Equation 2:

$$R_{th} = \{[(n_x+n_y)/2] - n_z\}d \qquad \text{Equation (2)}$$

In Equations 1 and 2, $n_x$ is a refractive index in a direction having a highest in-plane refractive index in a plane of the compensation film (hereinafter, referred to as a 'slow axis'), $n_y$ is a refractive index in a direction having a lowest in-plane refractive index in a plane of the compensation film (hereinafter, referred to as a 'fast axis'), $n_z$ is a refractive index in a direction perpendicular to the slow axis and the fast axis of the compensation film, and d is a thickness of the compensation film.

The compensation film may have predetermined in-plane retardation and thickness direction retardation by changing the $n_x$, $n_y$, $n_z$, and/or the thickness (d).

The compensation film may be used alone or along with other compensation films.

The compensation film may be used with a polarizer and may be used as an optical film to prevent reflection of external light of a display device.

The optical film may be for example an anti-reflective film, but is not limited thereto.

The compensation film may be applied to various display devices.

The display device may be for example a liquid crystal display (LCD) or an organic light emitting diode (OLED) display, but is not limited thereto.

Hereinafter, the embodiments are illustrated in more detail with reference to examples.

However, these examples are exemplary, and the present disclosure is not limited thereto.

Synthesis of Silane Dispersing Agent

SYNTHESIS EXAMPLE 1

Chemical Formula 1aa

Reaction Scheme 1

COMPOUND 1

-continued

1aa

7.34 g (10 mmol) of Compound 1 (Triton X-102, Sigma Aldrich Co., Ltd.), 2.48 g (10 mmol) of 3-(triethoxysilyl)propyl isocyanate, and 24 mg of tin(II) 2-ethylhexanoate are put in a dried 250 mL round-bottomed flask and then, stirred at 60° C. under a nitrogen atmosphere for 24 hours to obtain a silane dispersing agent as a yellow viscous liquid represented by Chemical Formula 1aa.

$^1$H NMR (CDCl$_3$) 600 MHz, δ, ppm: 0.75 (s, 9H), 1.19 (t, 9H) 1.30 (s, 6H), 1.60 (m, 2H), 1.69 (s, 2H), 3.09 (m, 2H), 3.60 (m, 2H), 3.77 (q, 6H) 3.64 (m, 38H), 3.72 (m, 4H), 3.85 (m, 2H), 4.10 (m, 2H), 6.82 (d, 2H), 7.26 (d, 2H).

FT-IR Si—O band shape peak in a 3350-3300 cm$^{-1}$ region and N—H band shape peak in a 1200-1000 cm$^{-1}$ region.

SYNTHESIS EXAMPLE 2

Reaction Scheme 2

1ba 6.26 g (10 mmol) of Compound 2 (decaethylene glycol monododecyl ether, Sigma Aldrich Co., Ltd.), 2.48 g (10 mmol) of 3-(triethoxysilyl)propyl isocyanate, and 24 mg of tin(II) 2-ethylhexanoate are put in a dried 250 mL round-bottomed flask, and then stirred at 60° C. under a nitrogen atmosphere for 24 hours to obtain a silane dispersing agent as a yellow viscous liquid represented by Chemical Formula 1ba.

Chemical Formula 1ba

FT-IR Si—O band shape peak in a 3350-3300 cm$^{-1}$ region and an N—H band shape peak in a 1200-1000 cm$^{-1}$ region.

SYNTHESIS EXAMPLE 3

Reaction Scheme 3

COMPOUND 3

1bb 7.28 g (10 mmol) of Compound 3 (PEG(12) tridecyl ether, Sigma Aldrich Co., Ltd.), 2.48 g (10 mmol) of 3-(triethoxysilyl)propyl isocyanate, and 24 mg of tin(II) 2-ethylhexanoate are put in a dried 250 mL round-bottomed flask, and then stirred at 60° C. under a nitrogen atmosphere for 24 hours to obtain a silane dispersing agent as a yellow viscous liquid represented by Chemical Formula 1bb.

Chemical Formula 1bb

Chemical Formula 1bc

FT-IR Si—O band shape peak in a 3350-3300 cm$^{-1}$ region and an N—H band shape peak confirmation in a 1200-1000 cm$^{-1}$ region.

FT-IR Si—O band shape peak in a 3350-3300 cm$^{-1}$ region and an N—H band shape peak confirmation in a 1200-1000 cm$^{-1}$ region.

SYNTHESIS EXAMPLE 4

SYNTHESIS EXAMPLE 5

10 g (10 mmol) of Compound 4 (PEG(18) tridecyl ether, Sigma Aldrich Co, Ltd.), 2.48 g (10 mmol) of 3-(triethoxysilyl)propyl isocyanate, and 24 mg of tin(II) 2-ethylhexanoate are put in a dried 250 mL round-bottomed flask, and then stirred at 60° C. under a nitrogen atmosphere for 24 hours to obtain a silane dispersing agent as a yellow viscous liquid represented by Chemical Formula 1bc.

6.24 g (10 mmol) of Compound 5 (Triton N-101 Reduced, Sigma Aldrich Co., Ltd.), 2.48 g (10 mmol) of 3-(triethoxysilyl)propyl isocyanate, and 24 mg of tin(II) 2-ethylhexanoate are put in a dried 250 mL round-bottomed flask, and then stirred at 60° C. under a nitrogen atmosphere for 24 hours to obtain a silane dispersing agent as a yellow viscous liquid represented by Chemical Formula 1ca.

Chemical Formula 1ca

FT-IR Si—O band shape peak in a 3350-3300 cm$^{-1}$ region and an N—H band shape peak confirmation in a 1200-1000 cm$^{-1}$ region.

Preparation of Modified Nanostructured Filler

PREPARATION EXAMPLE 1

Oleic acid (2 M) is added to isopropyl alcohol (50 ml), then, titanium isopropoxide (0.25 M) is added thereto, and the mixture is stirred for 4 hours.

The resulting mixture is heat-treated at 180° C. for 4 hours in a microwave, and then separated and purified in toluene.

Subsequently, 2 g of the silane dispersing agent according to Synthesis Example 1 is added thereto, and the obtained mixture is stirred and reacted at 150° C. under a condition of 8 atm for 4 hours in the microwave to obtain a modified nanostructured filler.

PREPARATION EXAMPLE 2

A modified nanostructured filler is manufactured according to the same method as Preparation Example 1, except for using the silane dispersing agent according to Synthesis Example 2 instead of the silane dispersing agent according to Synthesis Example 1.

PREPARATION EXAMPLE 3

A modified nanostructured filler is manufactured according to the same method as Preparation Example 1, except for using the silane dispersing agent according to Synthesis Example 3 instead of the silane dispersing agent according to Synthesis Example 1.

PREPARATION EXAMPLE 4

A modified nanostructured filler is manufactured according to the same method as Preparation Example 1, except for using the silane dispersing agent according to Synthesis Example 4 instead of the silane dispersing agent according to Synthesis Example 1.

PREPARATION EXAMPLE 5

A modified nanostructured filler is manufactured according to the same method as Preparation Example 1, except for using the silane dispersing agent according to Synthesis Example 5 instead of the silane dispersing agent according to Synthesis Example 1.

Preparation of Polymer Composite

EXAMPLE 1

2.8 g of polyimide is mixed with 37.2 g of dimethyl acetamide (DMAc) to prepare 40 g of a solution.

3.7 volume % of the modified nanostructured filler of Preparation Example 1 is mixed with this solution to prepare a coating solution.

Subsequently, the coating solution is cast on a 15 cm×8 cm glass substrate by using a doctor blade.

The cast substrate is dried primarily at 100° C. for 30 minutes on a hot plate and secondarily at 230° C. for 90 minutes in a furnace under a nitrogen atmosphere to manufacture an about 3 μm-thick polymer composite.

EXAMPLE 2

A polymer composite is manufactured according to the same method as Example 1, except for using 3.7 volume % of the modified nanostructured filler according to Preparation Example 2 instead of the modified nanostructured filler according to Preparation Example 1.

EXAMPLE 3

A polymer composite is manufactured according to the same method as Example 1, except for using 4.7 volume % of the modified nanostructured filler according to Preparation Example 2 instead of the modified nanostructured filler according to Preparation Example 1.

EXAMPLE 4

A polymer composite is manufactured according to the same method as Example 1, except for using 2.5 volume % of the modified nanostructured filler according to Preparation Example 2 instead of the modified nanostructured filler according to Preparation Example 1.

EXAMPLE 5

A polymer composite is manufactured according to the same method as Example 1, except for using 2.6 volume % of the modified nanostructured filler according to Preparation Example 2 instead of the modified nanostructured filler according to Preparation Example 1.

COMPARATIVE EXAMPLE 1

A polymer composite is manufactured according to the same method as Example 1, except for using 3.9 volume % of TiO$_2$ nanorods (DT-TIOS-10MEK-W20, Ditto Tech) instead of the modified nanostructured filler according to Preparation Example 1.

Comparative Example 2

A polymer composite is manufactured according to the same method as Example 1, except for using 5.3 volume % of TiO$_2$ nanorods (DT-TIOS-10MEK-W20, Ditto Tech) instead of the modified nanostructured filler according to Preparation Example 1.

COMPARATIVE EXAMPLE 3

A polymer composite is manufactured according to the same method as Example 1, except for using 6.6 volume % of TiO$_2$ nanorods (DT-TIOS-10MEK-W20, Ditto Tech) instead of the modified nanostructured filler according to Preparation Example 1.

Reference Example

A polymer composite is manufactured according to the same method as Example 1, except for not including the modified nanostructured filler according to Preparation Example 1.

Evaluation

Optical properties of the polymer composites according to Examples 1 to 5 and Comparative Examples 1 to 3 are evaluated.

Light transmittance, a haze, and a yellow index (YI) are measured by using an UV spectrophotometer (cm-3600d, Konica Minolta Co.), and herein, the haze uses a D1003-07(A) standard, and the yellow index uses a D1925 standard.

A refractive index is measured at a wavelength of 450 nm by using a prism coupler (2010/M, Metricon Corp.).

Figure 1:
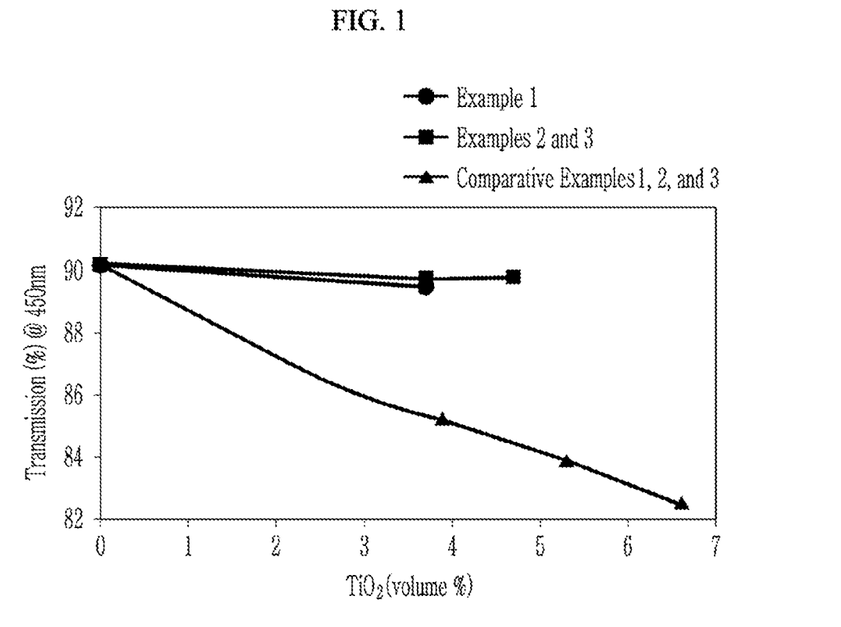
FIG. 1 is a graph of light transmission (%) versus nanostructured filler volume (volume percent), showing optical properties of the polymer composite according to an embodiment.
Figure 2:
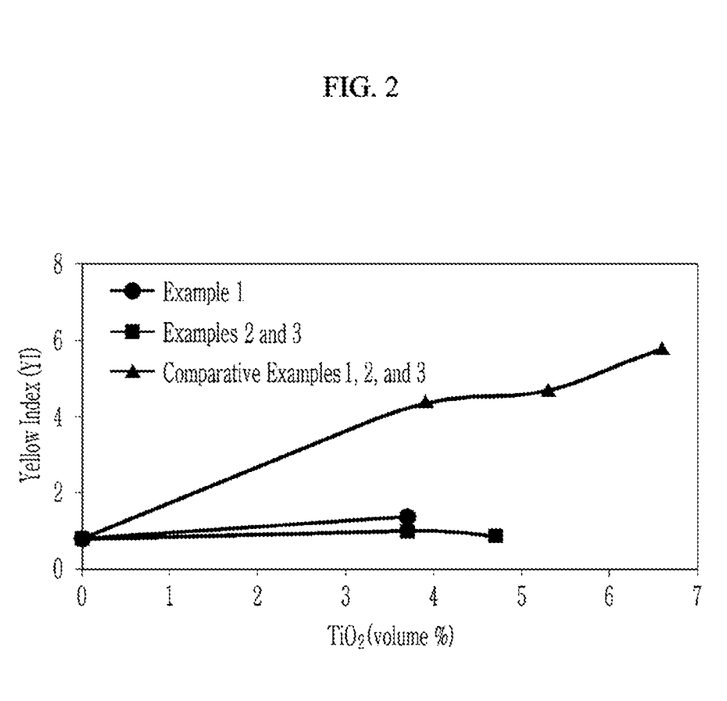
FIG. 2 is a graph of yellow index (YI) versus nanostructured filler volume (volume percent), showing optical properties of the polymer composite according to an embodiment.
Figure 3:
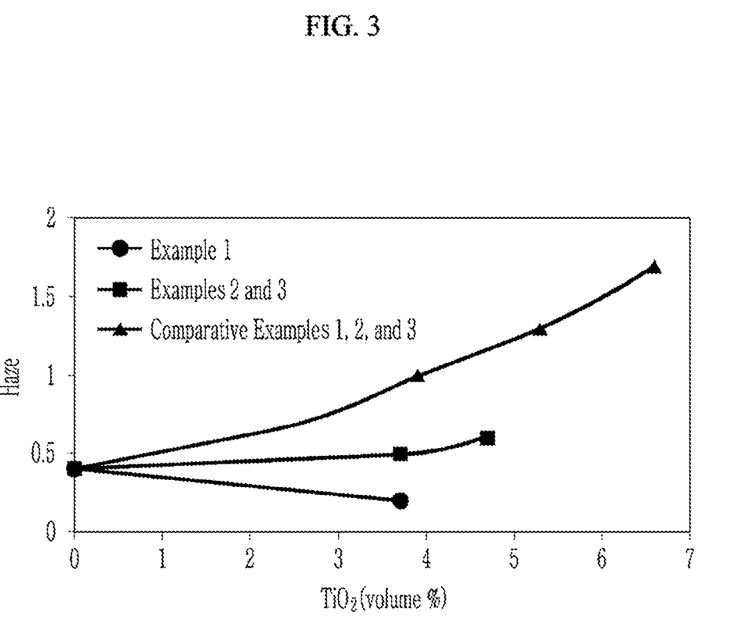
FIG. 3 is a graph of haze versus nanostructured filler volume (volume percent), showing optical properties of the polymer composite according to an embodiment.
Figure 4:
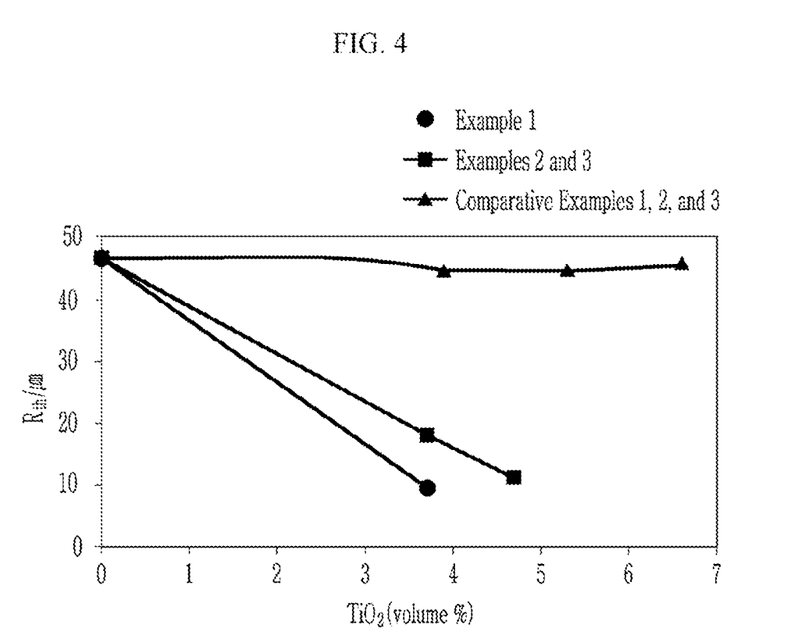
FIG. 4 is a graph of thickness direction retardation ($R_{th}$ per micrometer, "$R_{th}/\mu m$") versus nanostructured filler volume (volume percent), showing optical properties of the polymer composite according to an embodiment.

The results are shown in Table 1 and FIGS. 1 to 4.

FIGS. 1 to 4 are graphs showing optical properties of the polymer composites according to Examples 1 to 3 and Comparative Examples 1 to 3.

TABLE 1

|  | Light transmittance (%, @450 nm) | Yellow index (YI) | Haze | Retardation ($R_{th}/\mu m$) |
|---|---|---|---|---|
| Reference Example | 90.2 | 0.8 | 0.4 | 46.5 |
| Example 1 | 89.5 | 1.4 | 0.2 | 9.6 |
| Example 2 | 89.7 | 1.0 | 0.5 | 18.2 |
| Example 3 | 89.8 | 0.9 | 0.6 | 11.3 |
| Example 4 | 87.7 | 2.9 | 0.4 | — |
| Example 5 | 90.1 | 1.0 | 0.3 | — |
| Comparative Example 1 | 85.2 | 4.4 | 1.0 | 44.7 |
| Comparative Example 2 | 83.9 | 4.7 | 1.3 | 44.6 |
| Comparative Example 3 | 82.5 | 5.8 | 1.7 | 45.7 |

Referring to Table 1 and FIGS. 1 to 4, the polymer composites according to Examples 1 to 5 shows high light transmittance but a low yellow index and a low haze compared with the polymer composites according to Comparative Examples 1 to 3.

Specifically, the polymer composites according to Examples 1 to 5 satisfy light transmittance of greater than or equal to about 85%, a haze of less than or equal to about 1, and a yellow index of less than or equal to about 3.5 and within the ranges, light transmittance of greater than or equal to about 87%, a haze of less than or equal to about 0.8, and a yellow index of less than or equal to about 3.0.

Accordingly, the polymer composites according to Examples 1 to 5 includes a modified nanostructured filler and thus may reduce agglomeration of a nanostructured filler in a polymer but increase dispersibility and resultantly, prevent deterioration of the optical characteristics.

In addition, the polymer composites according to Examples 1 to 5 may change a phase difference due to the modified nanostructured filler and accordingly, be effectively applied to an optical film such as a compensation film.

While this disclosure has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. A polymer composition, comprising:
   a polymer;
   a nanostructured filler; and
   a silane dispersing agent represented by one of Chemical Formulae 1a, 1c, or 1d Chemical Formula 1a Chemical Formula 1c or Chemical Formula 1d wherein, in Chemical Formulae 1a 1c and 1d,
$R^7$ to $R^9$ are each independently a methyl group or an ethyl group,
t1 is 1, and
q is an integer ranging from 9 to 30.

2. The polymer composition of claim 1, wherein the silane dispersing agent is bound to a surface of the nanostructured filler.

3. The polymer composition of claim 1, wherein the nanostructured filler comprises an inorganic nanoparticle, an inorganic nanorod, an inorganic nanoplate, an inorganic nanowire, an inorganic nanoflake, an inorganic nanotube, an inorganic nanocapsule, or a combination thereof.

4. The polymer composition of claim 3, wherein the nanostructured filler comprises $TiO_2$, $ZrO_2$, $BaTiO_3$, $SrTiO_3$, $Cu_2O$, $CuO$, $Cr_2O_3$, $Fe_2O_3$, $Mn_3O_4$, $MnO_2$, $NiO$, $ZnO$, or a combination thereof.

5. The polymer composition of claim 1, wherein the nanostructured filler has a long diameter of less than or equal to about 100 nanometers.

6. The polymer composition of claim 1, wherein the polymer comprises a polyolefin, a polyamide, a polyimide, a polyester, a poly(meth)acrylate, polystyrene, an epoxy polymer, a polycarbonate, a polysiloxane, a polyurethane, a copolymer thereof, or a combination thereof.

7. The polymer composition of claim 6, wherein the polymer comprises polyethylene, polypropylene, polyamide, a polyimide, polyethylene terephthalate, polyethylene terephthalate glycol, polyethylene naphthalate, a nylon, polydimethylsiloxane, a polyurethane, a copolymer thereof, or a combination thereof.

8. A polymer composite, comprising
   the polymer composition according to claim 1, wherein the nanostructured filler and the silane dispersing agent are dispersed in the polymer.

9. he polymer composite of claim 8, wherein the nanostructured filler and the silane dispersing agent are included in an amount of about 0.1 volume percent to about 20 volume percent based on a total volume of the polymer composite.

10. An optical film comprising the polymer composite of claim 8.

11. The optical film of claim 10,
    wherein the thickness of the optical film is about 0.1 micrometers to about 500micrometers, and
    wherein the optical film satisfies a visible light transmittance of greater than or equal to about 85% at a wavelength of 450 nanometers, a haze of less than about 1 as determined according to ASTM D1003-07, and a yellow index of less than or equal to about 3.5 as determined according to ASTM D1925.

12. A polymer composition comprising:
a polymer and a modified nanostructured filler,
wherein the modified nanostructured filler comprises a nanostructured filler and a silane dispersing agent represented by one of Chemical Formulae 1a', 1c', or 1d' and bound to a surface of the nanostructured filler Chemical Formula 1a'

Chemical Formula 1c' or

Chemical Formula 1d' wherein, in Chemical Formulae 1a', 1c', and 1d',
t1 is 1,
q is an integer ranging from 9 to 30,
* is the binding site to the surface of the nanostructured filler.

13. The polymer composition of claim 12, wherein the nanostructured filler comprises an inorganic nanoparticle, an inorganic nanorod, an inorganic nanoplate, an inorganic nanowire, an inorganic nanoflake, an inorganic nanotube, an inorganic nanocapsule, or a combination thereof.

14. The polymer composition of claim 13, wherein the nanostructured filler comprises $TiO_2$, $ZrO_2$, $BaTiO_3$, $SrTiO_3$, $Cu_2O$, $CuO$, $Cr_2O_3$, $Fe_2O_3$, $Mn_3O_4$, $MnO_2$, $NiO$, $ZnO$, or a combination thereof.

15. The polymer composition of claim 12, wherein the nanostructured filler has a long diameter of less than or equal to about 100 nanometers.

16. The polymer composition of claim 12, wherein the modified nanostructured filler is included in an amount of about 0.1 volume percent to about 20 volume percent, based on a total volume of the polymer and the modified nanostructured filler.

17. The polymer composition of claim 12, wherein the polymer comprises a polyolefin, a polyamide, a polyimide, a polyester, a poly(meth)acryl, polystyrene, an epoxy, a polycarbonate, a polysiloxane, a polyurethane, a copolymer thereof, or a combination thereof.

18. The polymer composition of claim 17, wherein the polymer comprises a polyethylene, a polypropylene, a polyamide, a polyimide, a polyethylene terephthalate, a polyethylene terephthalate glycol, a polyethylene naphthalate, a nylon, a polydimethylsiloxane, a polyurethane, a copolymer thereof, or a combination thereof.

19. A polymer composite, comprising
the polymer composition according to claim 12, wherein the modified nanostructured filler is dispersed in the polymer.

20. The polymer composite of claim 19, wherein the modified nanostructured filler is included in an amount of about 0.1 volume percent to about 20 volume percent based on a total volume of the polymer composite.

21. The polymer composite of claim 19, wherein the polymer composite is in a film form, and
the polymer composite satisfies a visible light transmittance of greater than or equal to about 85% at a wavelength of 450 nanometers, a haze of less than about 1 as determined according to ASTM D1003-07, and a yellow index of less than or equal to about 3.5, as determined according to ASTM D1925.

22. An optical film comprising the polymer composite of claim 19.

* * * * *